United States Patent [19]

Martin

[11] 4,254,969
[45] Mar. 10, 1981

[54] SLIDE LOCK TRAILER HITCH
[76] Inventor: Howard H. Martin, 500 Mart Ave., Waterford, Calif. 95386
[21] Appl. No.: 49,107
[22] Filed: Jun. 18, 1979
[51] Int. Cl.³ .............................................. B60D 1/16
[52] U.S. Cl. .................................. 280/478 B; 280/477
[58] Field of Search .................... 280/475, 477, 478 R, 280/478 A, 478 B, 482

[56] References Cited
U.S. PATENT DOCUMENTS

| | | | |
|---|---|---|---|
| 2,703,243 | 2/1955 | Clark | 280/478 B X |
| 2,820,649 | 1/1958 | Demarest | 280/478 B |
| 2,871,029 | 1/1959 | Demarest | 280/478 B X |
| 3,410,577 | 11/1968 | Luinstra | 280/478 A |
| 3,841,663 | 10/1974 | Proffit | 280/475 X |
| 3,860,267 | 1/1975 | Lyons | 280/478 B |
| 4,042,254 | 8/1977 | Allen | 280/478 B |

Primary Examiner—John J. Love
Assistant Examiner—Randall A. Schrecengost
Attorney, Agent, or Firm—Lothrop & West

[57] ABSTRACT

A trailer hitch facilitates coupling between a towing vehicle and a trailer where their respective coupling members are in close proximity, but not exact registration. The hitch is capable of being disengaged from a retracted locked position and of being moved forward relative to the trailer as well as in a lateral direction to permit ready coupling of the trailer and towing vehicle. After coupling is completed, the towing vehicle exerts rearward force against the hitch, causing the hitch to abut and be centered by a centering frame. An automatic latching mechanism completes the coupling by locking the hitch in retracted position. A back-up pin type lock precludes accidental uncoupling.

5 Claims, 6 Drawing Figures

SLIDE LOCK TRAILER HITCH

BACKGROUND OF THE INVENTION

This invention relates to improvements in trailer hitches and especially to hitches used in situations where repeated hitching and unhitching operations must be made quickly, easily, and safely.

During a hitching operation, difficulty in the past centered around coupling the draft member of the trailer to the hitching means of the tractor. Where registration of the draft member and the hitching means was not precise, the operator was faced with either jockying the towing vehicle or moving the trailer to effect alignment. Both of these alternatives proved difficult and time consuming.

The prior art discloses a number of attempts towards remedying the problem. Demarest, U.S. Pat. Nos. 2,820,649 and 2,871,029, as well as Lyons U.S. Pat. No. 3,860,267 and Allen U.S. Pat. No. 4,042,254, show coupling mechanisms which permit hitching a towing vehicle to a trailer where they are merely in reasonably close proximity, rather than in precise alignment.

There is, however, considerable room for improvement.

SUMMARY OF THE INVENTION

The invention relates to safe and convenient means for coupling a trailer to a tow vehicle where the respective hitching components are merely in close proximity rather than in register.

It is an object of the invention to provide self aligning means ensuring that once trailer and tow vehicle are hitched and the latter backs up, the two vehicles will automatically become properly aligned for subsequent towing.

It is a further object to include automatic locking means whereby the draft member between the trailer and the tow vehicle is positively secured following alignment of the vehicles, thereby permitting the draft member to transfer forces acting on it in a safe manner.

A still further object is to provide vertically adjustable support means to position the hitching means of the trailer at a selective height especially during hitching and unhitching.

BRIEF DESCRIPTION OF THE FIGURES

Other objects, together with the foregoing are attained in the embodiment described in the following description and shown in the accompanying drawings in which.

DETAILED DESCPRITION OF PREFERRED EMBODIMENT

Although the trailer hitch of the invention is susceptible of numerous different physical embodiments, depending upon the environment and requirements of use, a hitch constructed in accordance with the herein shown and described embodiment has been made and tested and has performed in an eminently satisfactory manner.

Figure 1:
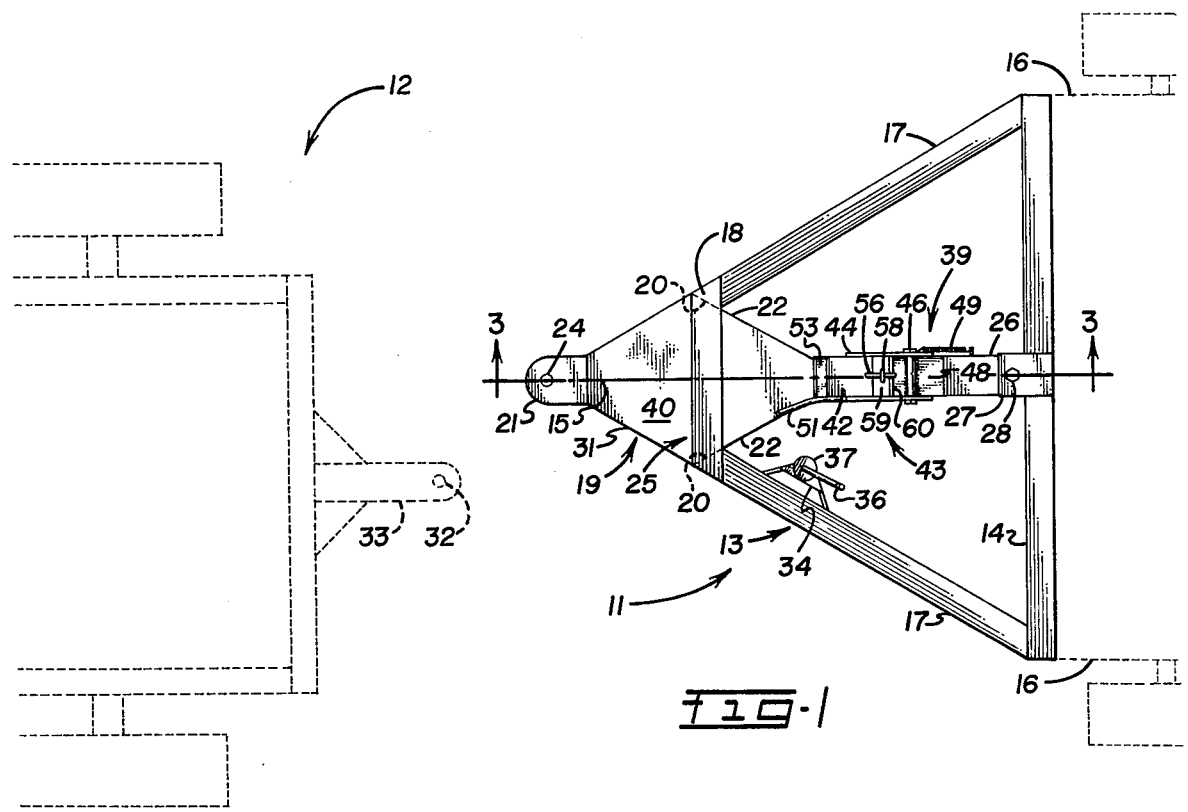
FIG. 1 is a top plan view of a preferred embodiment of the present invention in a nested or retracted position, a typical towing vehicle being shown in outline in dotted lines and with the respective coupling elements of the tow vehicle and the trailer hitch in reasonably close proximity although not in precise registry.

With particular reference to FIG. 1, the trailer hitch of the invention is generally designated by the numeral 11 and is shown in relatively close proximity to the tow bar of a conventional towing vehicle 12.

A fore and aft elongated frame 13 is mounted on and projects forwardly from the front end of a trailer 16 supported on the customary ground-engaging wheels. The frame 13 is substantially bilaterally symmetrical about a fore and aft, longitudinal axis 15, the frame 13 having the shape in plan of a truncated triangle in which the base is a hollow, square-in-section cross beam 14 mounted on the forward end of the trailer 16 and the forwardly converging sides are hollow section diagonal beams 17. Spanning the forward vertical end plates 20 of the diagonal beams 17 is a verticallly spaced pair of transverse horizontal plates 18, the transverse plates 18 and the forwardly diverging end plates 20 of the diagonal beams 17 forming a centering frame 25 having a central, transversely elongated horizontal aperture 29, or slot.

Extending through the transverse aperture 29 is a fore and aft main draft member 19 including a hitching tongue 21 on the forward end of the draft member 19, the hitching tongue being provided with an aperture 24 adapted to register with an opening 32 in the tow bar 33 of the towing vehicle 12 and to receive a hitch pin 38 so as to effect coupling.

The main draft member 19 also comprises an elongated draw bar 23 of hollow section extending aft from the hitching tongue 21 and telescoping into a hollow draft tube 26, the after end of the draft tube being pivotally mounted on a clevis 27 including a vertical pivot pin 28. The clevis 27 is mounted on and projects forwardly from the cross beam 14 and the pivot pin 28 is situated on the longitudinal axis of the main frame 13. Thus, the main draft member 19 is swingable from side to side, in a horizontal plane and through equal arcs to the right and to the left, the extent of the movement being limited by the ends 20 of the diagonal beams 17.

The ability to move the main draft member 19 angularly from side to side facilitates bringing the hitching tongue aperture 24 into register with the tow bar aperture 32. Furthermore, since the draw bar 23 also can be telescoped forwardly relative to the draft tube 26, it becomes relatively simple to effect hitching of the trailer to the towing vehicle, it being merely necessary to extend the draw bar 23 in telescoping fashion so that the radius of the hitching tongue aperture 24, measured from the vertical axis of the pivot pin 28, is such that when the main draft member 19 is swung laterally, the two hitching apertures 24 and 32 are brought into register and are capable of accepting the hitch pin 38.

As a result of this construction it is not necessary to bring the tractor 12 into careful longitudinal alignment with the trailer 16. Instead, it is only necessary that the tow bar 33 be in reasonably close proximity to the hitching tongue 21 of the towed trailer, as in FIG. 1.

In order to position the hitching tongue 21 at the proper elevation relative to the height of the tow bar 33 a vertical screw jack 34 is mounted on one of the diagonal beams 17. Movement of a crank handle 36 raises or lowers the main frame 13 by vertically ejecting or retracting a foot pad 37 supported on the ground surface 35.

During towing and in periods on non-use of the trailer, the draw bar 23 is customarily in nested, or base, or retracted position relative to the draft tube 26.

Figure 2:
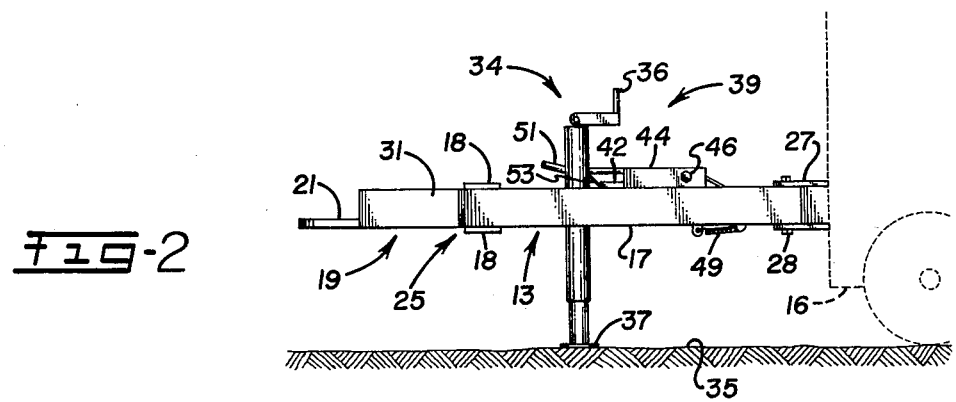
FIG. 2 is a side elevational view of the trailer hitch in nested position, the screw jack being shown as supported on the ground and a portion of the main body of the trailer being outlined in dotted lines.
Figure 3:
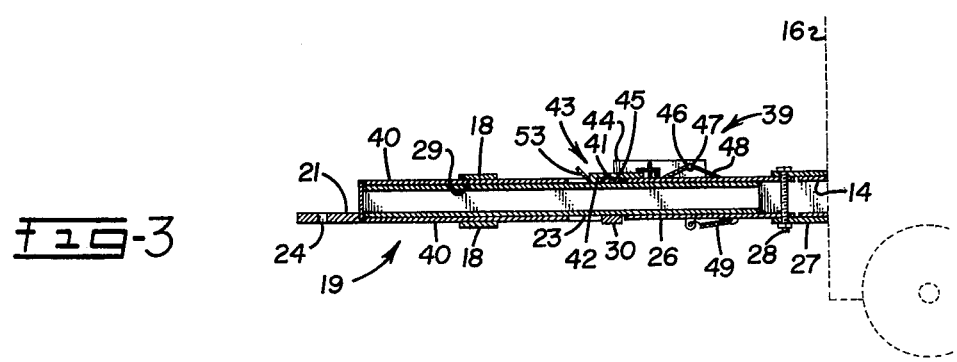
FIG. 3 is a median longitudinal cross-sectional view of the nested trailer hitch, taken on the line 3—3 in FIG. 1.

Thus, as most clearly appears in FIGS. 1-3, the draw bar 23 is located in a fully retracted position, and in this position an opposite pair of rearwardly converging side walls 22 mounted on opposite lateral sides of the draw bar 23 is in face to face abutment with the respective pair of sloping ends 20 of the diagonal beams 17.

In order to add strength to the rearwardly converging side walls 22, a pair of vertically spaced, roughly diamond-shaped in plan plates 40 is mounted symmetrically on the upper and lower surfaces of the draw bar 23, and a pair of forwardly converging side walls 31 spans the upper and lower plates 40 on the forward portion of the diamond-shaped plates 40.

In fully nested position, in other words, the inclined forward ends 20 of the diagonal beams 17 abut the sloping walls 22 and thus are effective to center the main draft member 19 and to cause its longitudinal axis to coincide with the central, longitudinal, fore and aft axis 15 of the main framework 13.

The draw bar 23 is selectively maintained in the fully retracted position owing to the provision of a latching mechanism 39 including a latch body 43 pivotally mounted for up and down movement on the draft tube 26. When the draw bar 23 is in fully nested position, a transverse latch bar detent 42, or latch detent, mounted on the forward end of the pivotally mounted latch body 43 abuts, or engages, the forward face of a latch bar 41 mounted transversely on the top of the draw bar 23, and thereby prevents forward movement of the draw bar 23 relative to the draft tube 26 when the latch body 43 is in down, or closed, or locked position.

The lateral sides of the latch body 43 have mounted thereon a pair of upright lateral plates 44. Mounted on the plates are the ends of a transverse shaft 46 journaled in a transverse sleeve-like bearing 47 located at the top of a transverse arch 48 affixed to the top of the draft tube 26 as, clearly appears in FIGS. 1 and 3.

Figure 4:
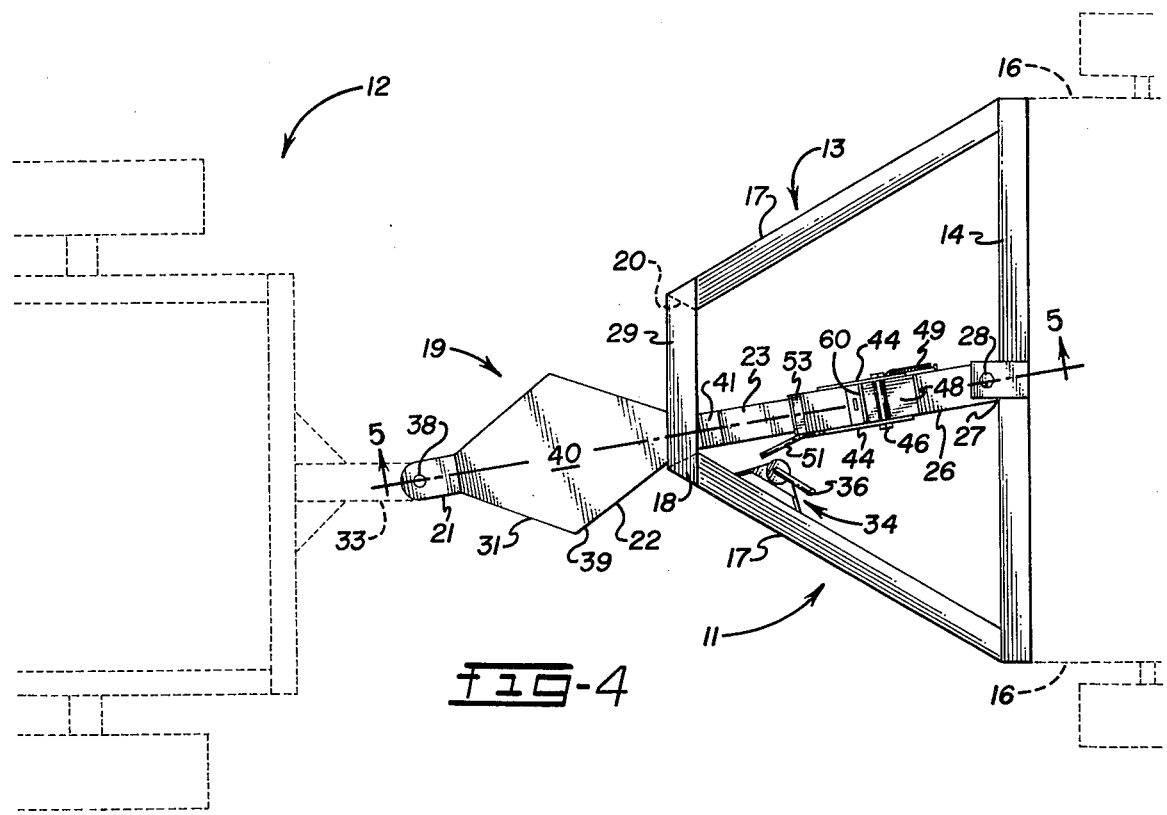
FIG. 4 is a top plan view of the trailer hitch in an extreme forwardly extended position as well as an extreme laterally extended position, the coupling elements of the two vehicle and the trailer hitch being shown in union.
Figure 5:
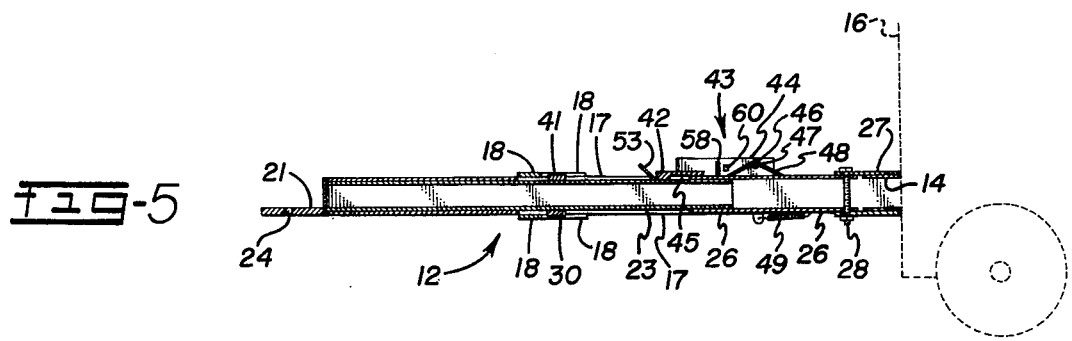
FIG. 5 is a longitudinal sectional view of the hitch in an extreme, extended lateral and forward longitudinal position, taken on the line 5—5 in FIG. 4; and, FIG. 6 is a median, fragmentary longitudinal sectional view of the draw bar and automatic locking mechanism taken to an enlarged scale, showing the draw bar locked in its extreme rearward position and the safety lock pin in place.
Figure 6:
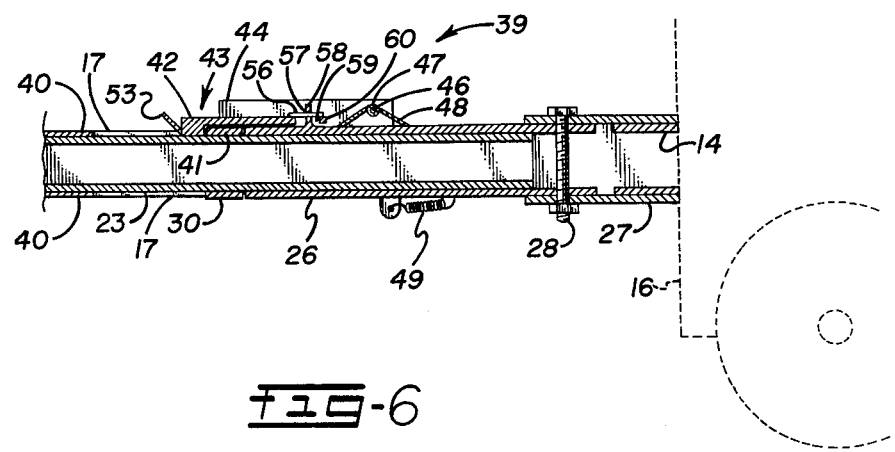

The latch body 43, in other words pivots about the axis of the transverse shaft 46, with the forward transversely oriented latch detent 42 moving between a first, lowered position (in which the transverse latch bar 41 is confined within a recess 45 located just aft of the latch detent 42) and a second, raised position (in which the latch bar is freed from its confinement). In the first, lowered position of the latch body 43, the draw bar 23 is unable to move, either fore or aft. In the second, raised position of the latch body 43, the draw bar 23 can be moved in a forward direction, for a considerable distance, until the transverse latch bar 41 abuts the top one of the transverse plates 18, located in interfering relation with the latch bar 41, as appears in FIG. 4 and FIG. 5 and a limit stop 30, mounted on the bottom of the draw bar 23 vertically below the latch bar 41, abuts the bottom one of the transverse plates 18, as appears in FIG. 5.

Biasing the latch body 43 downwardly into first, lowered position is a latch spring 49.

A hand operated lever 51 mounted on the latch body 43, however, enables the operator to elevate the latch body 43 against spring urgency whenever desired, usually to free the latch bar 41 and allow the draw bar 23 to be moved from retracted toward extended position.

A forwardly and upwardly inclined cam plate 53 is mounted on the forward end of the latch body 43 so that when the draw bar 23 is urged in an after direction with sufficient force, the transverse latch bar 41 first encounters and then wedges the cam plate 53 and the attached latch body 43 in an upward direction far enough to allow the latch bar 41 to side rearwardly until it clears the after wall of the latch detent 42 and becomes lodged within the latch recess 45 as the biasing spring 49 returns the latch body 43 to lowered position.

Thereafter, the draw bar 23 remains in latched, retracted position until the operator lifts the lever 51 and frees the transverse latch bar 41.

Additional security is effected by inserting a lock pin 56 through a fore and aft aperture 57 in a vertical stud 58 mounted on and upstanding from the top surface of the draft tube 26, the stud projecting upwardly with substantial clearance, through an opening 59 in the top of the latch body 43. The fore and aft ends of pin 56 extend over the upper surfaces of latch body 43 and transverse rod 60, respectively. With the lock pin 56 in place, accidental blows or buffeting are ineffective to dislodge the latch body 43 and free the draw bar 23 from its retracted position.

In summary, when it is desired to hitch the trailer 16 to the tractor 12, it is only necessary to bring the tow bar 33 into resonable proximity with respect to the trailer tongue 21, as in FIG. 1.

The hand lever 51 is then grasped and lifted far enough to clear the latch bar 41, at which juncture the draw bar 23 can be slid forwardly and swung laterally, pivoting about the clevis pin 28 until the tow bar opening 32 and the trailer tongue aperture 24 are in register, allowing the hitch pin 38 to be dropped into place and effect coupling.

If necessary, the jack 34 can be moved up or down to bring the trailer tongue 21 into proper vertical relation to the tow bar 33 during the forward and lateral positioning of the draw bar 23.

Then, after lifting the screw jack supporting pad 37 clear of the ground 35, by rotating the crank handle 36, the tractor 12 is put in reverse and slowly moved in an after direction. As soon as either of the rearwardly converging walls 22 abuts a respective end plate 20 of the centering frame 25, the end plate tends to urge the rearwardly moving draw bar 23 as well as the draft tube 26 into central, longitudinal alignment with the axis 15 of the main frame 13.

Depending upon the extent of initial misalignment between the tractor and the trailer, the operator may first pull forwardly and steer the tractor so as to decrease the misalignment, this being followed by reverse movement as described above. The tractor is guided rearwardly and cooperates with the self-aligning capabilities of the trailer hitch 11 to effect registration of draft member 19 within horizontal aperture 29.

As soon as the draw bar 23 has been pushed far enough toward the rear, the latch bar 41 engages the cam plate 53, and thus automatically lifts the latch body 43 against spring bias until the latch bar 41 clears the latch detent 42, allowing the latch body 43 to drop down and enclose the latch bar 41. After latching is thus effected, further security is afforded by installing the lock pin 56.

Hitching is then complete and the trailer can be towed and used to accomplish its intended purpose, after which unhitching is performed, if desired, by removing the hitch pin 38, thereby uncoupling the trailer from the tractor. Preferably the jack screw is properly positioned as to height prior to removing the hitch pin in order to facilitate pin removal and render the trailer in position suitable for the subsequent hitching operation.

I claim:

1. A trailer hitch comprising:
   a. a fore and aft elongated framework including a rear cross beam mounted on the front end of the trailer, said framework having a central longitudinal axis;
   b. a draft tube pivotally mounted at its after end on said cross beam substantially on said central longitudinal axis, said draft tube extending forwardly and being swingable from side in a substantially horizontal plane;
   c. a draw bar having its after portion slidably mounted within the forward portion of said draft tube for translational movement relative thereto between a first rearwardly retracted position and a second forwardly projected position;
   d. latch means for detachably locking said draft tube to said bar in said first position of said draw bar, said latch means including a latch bar mounted transversely on said draw bar, a transverse latch detent pivotally mounted on said draft tube and capable of engaging said latch bar in said first position of said draw bar, and a spring biasing said latch detent toward a position of engagement with said latch bar in said first position of said draw bar, said latch means further including a lever connected to said latch detent, said lever being capable of overcoming the biasing force of said spring and removing said latch detent from said latch bar upon the application of supervening force on said lever to permit the movement of said draw bar from said first position toward said second position;
   e. a transverse centering frame mounted on the forward end of said framework, said centering frame including a horizontal transverse top plate, a horizontal transverse bottom plate and a pair of vertical end plates defining with said top and bottom plates a horizontal transversely elongated aperture centered on said central longitudinal axis, said draw bar projecting forwardly through said aperture;
   f. coupling means on the forward end of said draw bar for detachably connecting said draw bar to a towing vehicle; and,
   g. centering means mounted on said draw bar and engageable with said end plates of said centering frame for biasing said draw bar toward alignment with said central longitudinal axis as said draw bar is urged from said second position toward said first position and said centering means encounters said end plates, said centering means including a pair of rearwardly converging side walls mounted on the lateral sides of said draw bar, said side walls being engageable with said vertical end plates of said centering frame as said draw bar is moved through said transversely elongated aperture from said second position toward said first position.

2. A trailer hitch as in claim 1 including means on said draw bar for limiting the extent of forward movement of said draw bar to said second position.

3. A trailer hitch as in claim 2 in which said coupling means includes a draft tongue.

4. A trailer hitch as in claim 2 further including adjustable jack means for supporting said framework at a predetermined height when said coupling means is detached from the towing vehicle.

5. A trailer hitch as in claim 1 in which the maximum transverse dimension between said converging side walls is substantially equal to the distance between said vertical end plates of said centering frame, said side walls nesting snugly between said end plates in said first position of said draw bar and having at least one of said side walls spaced from the adjacent of said end plates in said second position of said draw bar.

* * * * *